(12) United States Patent
Squires et al.

(10) Patent No.: US 6,937,795 B2
(45) Date of Patent: Aug. 30, 2005

(54) COMBINATION WAVELENGTH MULTIPLEXER AND WAVELENGTH STABILIZER

(75) Inventors: Emily M. Squires, Littletown, MA (US); Hamid R. Khazaei, Westford, MA (US)

(73) Assignee: Optovia Corporation, Acton, MA (US)

( * ) Notice: Subject to any disclaimer, the term of this patent is extended or adjusted under 35 U.S.C. 154(b) by 118 days.

(21) Appl. No.: 10/690,857

(22) Filed: Oct. 22, 2003

(65) Prior Publication Data

US 2005/0089273 A1    Apr. 28, 2005

(51) Int. Cl.$^7$ ............................ G02B 6/34; H04J 14/02
(52) U.S. Cl. ............................. 385/37; 385/24; 385/14; 385/31; 385/88; 398/79; 398/82; 398/87
(58) Field of Search ............................. 385/37, 24, 31, 385/14, 129, 130, 131, 88, 92; 398/79, 82, 398/87

(56) References Cited

U.S. PATENT DOCUMENTS

| | | | |
|---|---|---|---|
| 5,737,459 A * | 4/1998 | Epworth et al. | 385/15 |
| 5,748,815 A * | 5/1998 | Hamel et al. | 385/37 |
| 6,782,017 B1 * | 8/2004 | Kai et al. | 372/29.02 |
| 6,795,631 B2 * | 9/2004 | Noro et al. | 385/132 |
| 2002/0041414 A1 * | 4/2002 | Oguma | 359/130 |
| 2002/0057875 A1 | 5/2002 | Kaneko | 385/37 |
| 2002/0168146 A1 * | 11/2002 | Watanabe | 385/50 |
| 2002/0181917 A1 * | 12/2002 | Noro et al. | 385/132 |
| 2004/0033021 A1 * | 2/2004 | Oguri et al. | 385/37 |

FOREIGN PATENT DOCUMENTS

GB        2351360        12/2000 ............... 385/37 X

OTHER PUBLICATIONS

Book entitled "Introduction To Optics", by Frank L. Pedrotti and Leno S. Pedrotti, Prentice Hall, 1987, pp. 415 and 421.

* cited by examiner

Primary Examiner—Brian M. Healy
(74) Attorney, Agent, or Firm—Erwin W. Pfeifle; Irwin Ostroff

(57) ABSTRACT

In an optical device, each of a plurality of radiation sources generates a separate different wavelength output signal to a wavelength locking device wherein a grating device receives the separate wavelength output signals from the plurality of radiation sources. The grating device generates a multiplexed wavelength output signal at a zero diffraction order output port thereof, and resolves separate symmetric wavelength−δ and wavelength−δ output signals at separate predetermined locations within at least one non-zero diffraction order thereof for each of the radiation sources. Each of a plurality of radiation detectors is coupled to receive a separate one of the symmetric wavelength−δ and wavelength−δ output signals and generate an output signal representing the magnitude of the received wavelength output signal. A control device is responsive to output signals from each pair of radiation detectors coupled to receive the separate symmetric wavelength+δ and wavelength−δ output signals from a specified predetermined radiation source for generating an output control signal appropriate to that radiation source for locking the wavelength thereof.

26 Claims, 5 Drawing Sheets

COMBINATION WAVELENGTH MULTIPLEXER AND WAVELENGTH STABILIZER

CROSS REFERENCE TO RELATED APPLICATIONS

This application is related to U.S. Ser. No. 10/690,858 entitled "DEVICES UTILIZING GRATINGS AND POWER TAPS WITH OPTIMIZED LOSS AND POWER SPLITTING CAPABILITIES" (Optovia 5), and has a common assignee and two common inventors with the present application and is being filed concurrently with the present application.

FIELD OF THE INVENTION

The present invention relates to optical systems utilizing transmitters and amplifier pump sources in which wavelengths generated by at least two radiation sources are multiplexed and individually locked in a grating based device.

BACKGROUND OF THE INVENTION

Wavelockers, devices used to maintain laser wavelengths, are extensively used in transmitters of telecommunication systems and can also be used to stabilize lasers used to pump amplifiers in such systems. Additionally, present day telecommunication amplifiers are requiring increasing levels of wavelength stable pump power that can be realized by multiplexing stabilized lasers of more than one wavelength and/or polarization.

U.S. Pat. No. 6,351,583 B1 (Bergmann et al.), issued on Feb. 26, 2002, discloses an optical apparatus for multiplexing a plurality of optical signals of different wavelengths by a frequency routing device to provide a multiplexed output signal. The frequency routing device comprises a plurality of input waveguides, each waveguide being coupled at its input end to a corresponding one of a plurality of lasers, and at the other end to an arrangement including a first star coupler, and a second star coupler interconnected by way of an array waveguide comprising a plurality of optical fibers of unequal length. An optical waveguide is connected to a first output port of the second star coupler for providing a multiplexed output optical signal from each of the plurality of lasers. First and second cross-coupling output ports from the second star coupler, located on opposite sides of the first output port, provide first and second cross-coupling output signals. Each of the first and second cross-coupling output signals is representative of the cross-coupling of each of the multiplexed optical signals with the cross-coupling output signals. The first and second cross-coupling output signals are equally strong for any given optical signal forming the multiplexed output signal when the optical signal has a wavelength substantially equal to a specified wavelength for that given optical signal. The first and second cross-coupling output signals are each converted to a separate electrical signal that are subtracted from one another in a subtracter. If there is no difference detected between the cross-coupling output signals for an optical signal, then a zero value will be generated at the output of the subtracter. If a difference in the cross-coupling output signals is detected by the subtraction process for any one of the multiplexed optical signals, the subtracter generates a control signal for that wavelength that is further processed and used to stabilize the associated laser generating that optical wavelength signal. One problem with this arrangement is that the stabilization feedback is performed on multiplexed signals and is dependent on having signal modulation for the detection of which wavelength in the multiplexed signal is drifting.

It is desirable to provide a grating based wavelength multiplexer and wavelength stabilizer that is not performed on multiplexed signals but rather on resolved separate wavelength signals generated by each of at least two radiation sources.

SUMMARY OF THE INVENTION

The present invention relates to optical systems utilizing transmitters and/or amplifiers in which wavelengths generated by at least two radiation sources are multiplexed for transmission or for use in amplification as an output signal from the system along with the wavelengths being separated and individually locked in a grating based device.

From a first apparatus aspect, the present invention is an arrangement for wavelength locking each of a plurality of radiation sources that generate separate wavelength output signals, the arrangement comprising a multiplexing/demultiplexing grating device, a plurality of radiation detectors, and a control device. The multiplexing/demultiplexing grating device receives the separate wavelength output signals from the plurality of radiation sources and generates a multiplexed wavelength output signal from the arrangement at a zero diffraction order output port of the grating device, and separate symmetric wavelength+$\delta$ and wavelength−$\delta$ output signals that are resolved at at least one separate predetermined location of a non-zero diffraction order area of the grating device for each radiation source. Each of the plurality of radiation detectors is coupled to receive a separate one of the symmetric wavelength+$\delta$ and wavelength−$\delta$ output signals from a separate one of the plurality of radiation sources, and to generate an output signal representing the magnitude of the received wavelength output signal. The control device responsive to output signals from each pair of radiation detectors that are coupled to receive the separate symmetric wavelength+$\delta$ and wavelength−$\delta$ output signals from a separate predetermined one of the plurality of radiation sources for generating a separate output control signal to each one of the plurality of radiation sources for locking the separate wavelength output signal thereof to a desired wavelength value.

From a second apparatus aspect, the present invention relates to a transmitter or amplifier pump source for use in an optical communication system comprising a plurality of radiation sources, and means for locking the wavelength of the radiation sources to the assigned value comprising a multiplexing/demultiplexing grating device, a plurality of radiation detectors, and a control device. Each of the plurality of radiation sources radiate light of a different assigned wavelength. The multiplexing/demultiplexing grating device receives the separate wavelength output signals from the plurality of radiation sources and generates a multiplexed wavelength output signal from the arrangement at a zero diffraction order output port of the grating device, and symmetric wavelength+$\delta$ and wavelength−$\delta$ output signals for each radiation source that are resolved at separate predetermined locations of a non-zero diffraction order of the grating device. Each of the plurality of radiation detectors is coupled to receive a separate one of the symmetric wavelength+$\delta$ and wavelength−$\delta$ output signals from a separate one of the plurality of radiation sources, and generates an output signal representing the magnitude of the received wavelength output signal. The control device is responsive to output signals from each pair of radiation detectors that are coupled to receive the separate wavelength+δ and wavelength−δ output signals from a separate predetermined one of the plurality of radiation sources for generating a separate output control signal to each one of the plurality of radiation sources for locking the separate wavelength output signal thereof to a desired wavelength value.

From a first method aspect, the present invention is a method of wavelength locking each of a plurality of radiation sources which generate different wavelength output signals. In the method, the wavelength output signals from the plurality of radiation sources are received in a multiplexing/demultiplexing grating device. The grating device is designed to generate a multiplexed wavelength output signal at a zero diffraction order output port of the grating device, and generate separate symmetric wavelength+δ and wavelength+δ output signals for each radiation source that are resolved at separate predetermined locations in a predetermined non-zero diffraction order of the grating device. Each of the resolved symmetric wavelength+δ and wavelength−δ output signals from the plurality of radiation sources is received by a separate one of a plurality of radiation detectors. Each radiation detector generates an output signal representing the magnitude of the received wavelength output signal. A control device is responsive to the output signals from each pair of radiation detectors that are coupled to receive the separate symmetric wavelength+δ and wavelength−δ output signals from a separate predetermined radiation source for generating therefrom a separate output control signal to each of the radiation sources for locking the wavelength thereof.

From a second method aspect, the present invention is a method of wavelength locking a plurality of wavelengths generated by a corresponding plurality of radiation sources of a transmitter or amplifier pump source in an optical communication system. In the method, the wavelength output signals from the plurality of radiation sources are received in a multiplexing/demultiplexing grating device for generating a multiplexed wavelength output signal at a zero diffraction order output port of the grating device, and generating separate symmetric wavelength+δ and wavelength−δ output signals for each radiation source that are resolved at separate predetermined locations of a predetermined non-zero diffraction order of the grating device. Each one of the symmetric wavelength+δ and wavelength−δ output signals from the plurality of radiation sources is received at a separate one of a plurality of radiation detectors, and an output signal is generated at each radiation detector representing the magnitude of the received wavelength output signal. Separate output control signals are generated by a control device in response to the output signals from each pair of radiation detectors that are coupled to receive the separate symmetric wavelength+δ and wavelength−δ output signals from a separate predetermined radiation source for locking the wavelength of each of the predetermined radiation sources.

The invention will be better understood from the following more detailed description taken with the accompanying drawings and claims.

The drawings are not necessarily to scale.

DETAILED DESCRIPTION OF THE INVENTION

Figure 1:
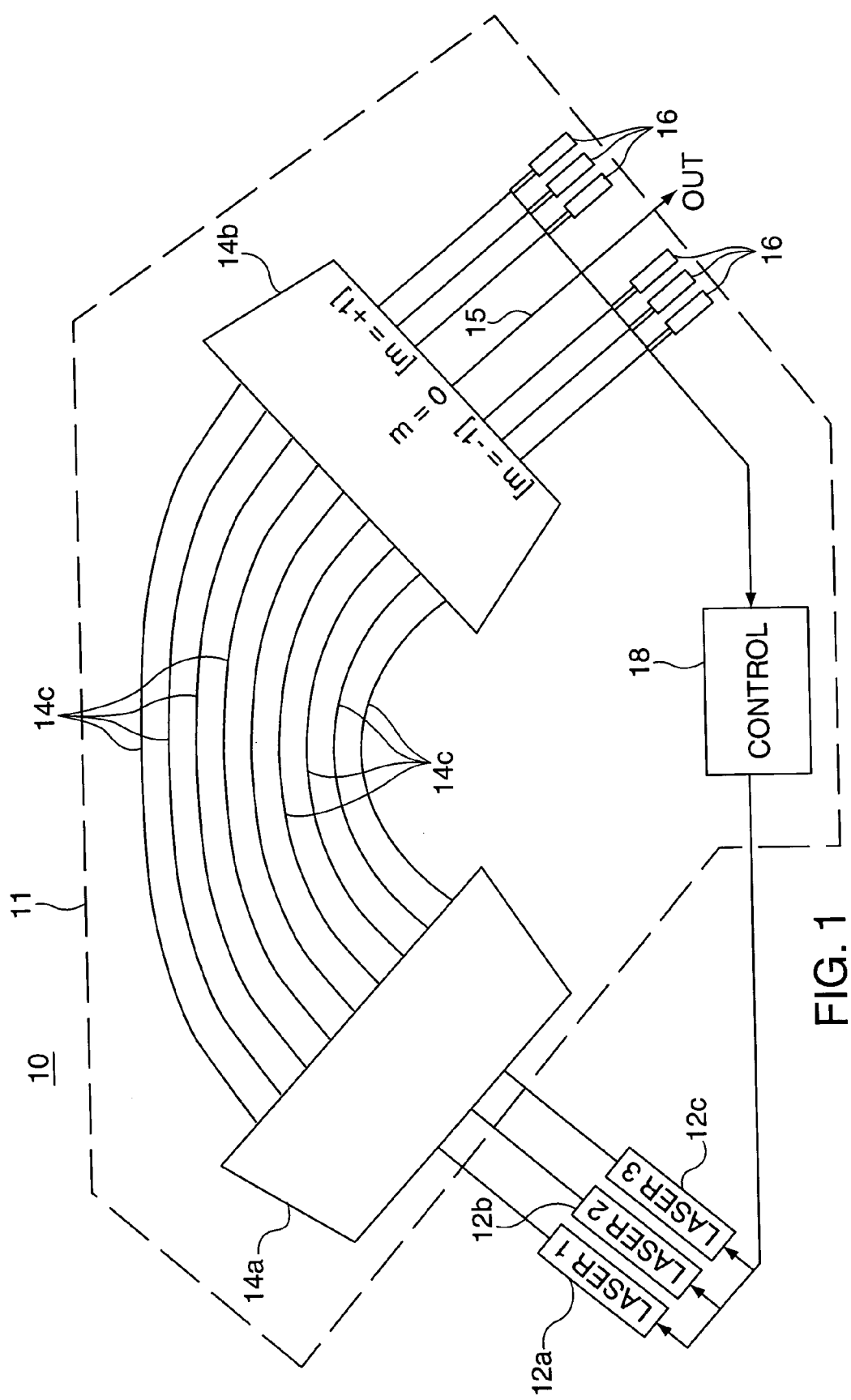
FIG. 1 is a schematic diagram of a transmitter including an optical wavelength locking arrangement in accordance with a first embodiment of the present invention.

Referring now to FIG. 1, there is shown a general schematic diagram of a transmitter 10 including a plurality of radiation sources (LASER 1, LASER 2, LASER 3) 12a, 12b, and 12c and an optical wavelength locking arrangement (hereinafter wavelocker) 11 (shown within a dashed line area) in accordance with a first embodiment of the present invention. The wavelocker 11 comprises a first Free Propagation Region (FPR) 14a, a second FPR 14b, an array waveguide section 14c formed from a plurality of different predetermined length waveguides, a plurality of either single or pairs of radiation detectors 16, and a control device 18. The radiation sources are shown as lasers 12a (LASER 1), 12b (LASER 2), and 12c (LASER 3). Each of the plurality of lasers 12a, 12b, and 12c are arranged to generate an output signal with a different predetermined wavelength. The output wavelength signals from the lasers 12a, 12b, and 12c are coupled to separate appropriate inputs of the first FPR 14a. The first and second FPRs 14a and 14b and the plurality of optical waveguides 14c form an Array Waveguide Grating (AWG) Multiplexer/Demultiplexer that multiplex or demultiplex optical signals as is well known in the art. In the typical case of an AWG multiplexer, multiple input signals from the lasers 12a, 12b, and 12c are individually positioned on a waveguide slab forming the first FPR 14a in such a way that, after propagating through the first waveguide slab, the array of waveguides 14c with off-set lengths, and a second waveguide slab forming the second FPR 14b, a zeroth diffraction order (m=0) of all input wavelength signals coincides with an output waveguide 15. Most of the power of the input signals from the lasers 12a, 12b, and 12c is found in the zeroth diffraction order (m=0), but some power resides in non-zero diffraction orders of m=−1, m=+1, m=−2, m=+2, etc, which power decreases as the diffraction order numbers increase.

A property of an array waveguide diffraction grating (AWG) is that spacings (hereinafter designated "a") of phase shifted array waveguides 14c, and the wavelength (hereinafter designated "w") of a channel from each of the lasers 12a, 12b, and 12c determines the location of the non-zero diffraction orders at the output of the second FPR 14b. This is shown in typical bulk grating equations such as shown in equation 1.

$$(m)(w) = a(\sin \theta i + \sin \theta m) \quad (1)$$

where m=diffraction order, w=wavelength, a=grating spacing, $\theta i$=incident angle, and $\theta m$=diffraction angle. Additionally, each non-zero diffraction order experiences an angular dispersion. For bulk gratings, this relationship is given by equation 2.

$$\text{Angular Dispersion} = d\theta m/dw = m/a \cos\theta m \quad (2)$$

As described by equations (1) and (2), the higher diffraction orders more efficiently separate the individual wavelengths of the lasers 12a, 12b, and 12c. However, except for blazed gratings, as the diffraction order increases, the intensity of the output signal decreases. The description hereinafter will be directed to a first symmetric diffraction order (m=+1, m=−1) when referring to non-zero diffraction orders. However, the present concept extends as well to the higher diffraction orders when they are used in the place of the first diffraction order when wavelength channel resolution is not easily accomplished in the first diffraction order area.

Figure 4:
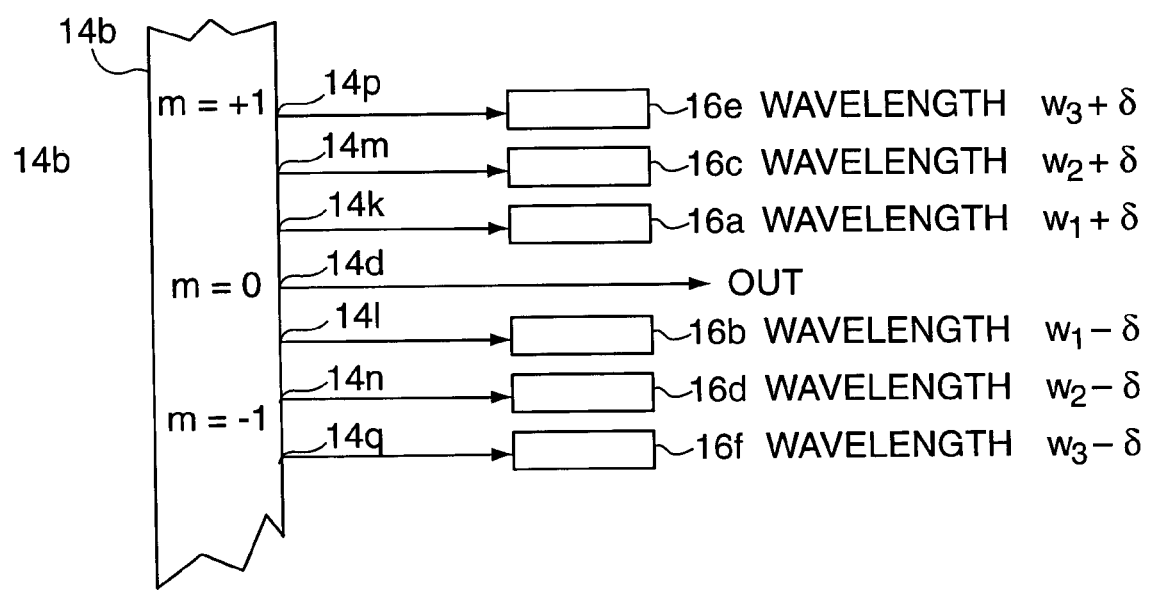
FIG. 4 is an exemplary enlarged portion of a free propagation region (FPR) at the output of the optical wavelength locking arrangement of FIG. 1 with radiation detectors positioned at separate predetermined output ports within two symmetrical nonzero diffraction orders in accordance with a second concept of the first embodiment of the present invention.

For densely spaced wavelength channels from the lasers 12a, 12b, and 12c, the shift in focus point for individual channel wavelengths for low diffraction orders is minor (and is zero for m=0). However, for widely-spaced wavelength channels, the array waveguide grating 14c can be designed such that the non-zero diffraction orders focus and sufficiently resolve individual wavelength channels such that the focused channel signals can be directed into separate individual output waveguides. As is shown in FIG. 1, the single or pairs of radiation detectors 16 (as shown in FIGS. 4 and 2, respectively) of the first embodiment of the present invention are coupled to separate outputs that are focused in an area of both or only one, respectively, of non-zero diffraction orders of the second FPR 14b to receive separate portions of wavelength channel light from one of the lasers 12a, 12b, and 12c (as will be described in greater detail hereinafter with reference to FIGS. 2, 3, and 4).

Figure 2:
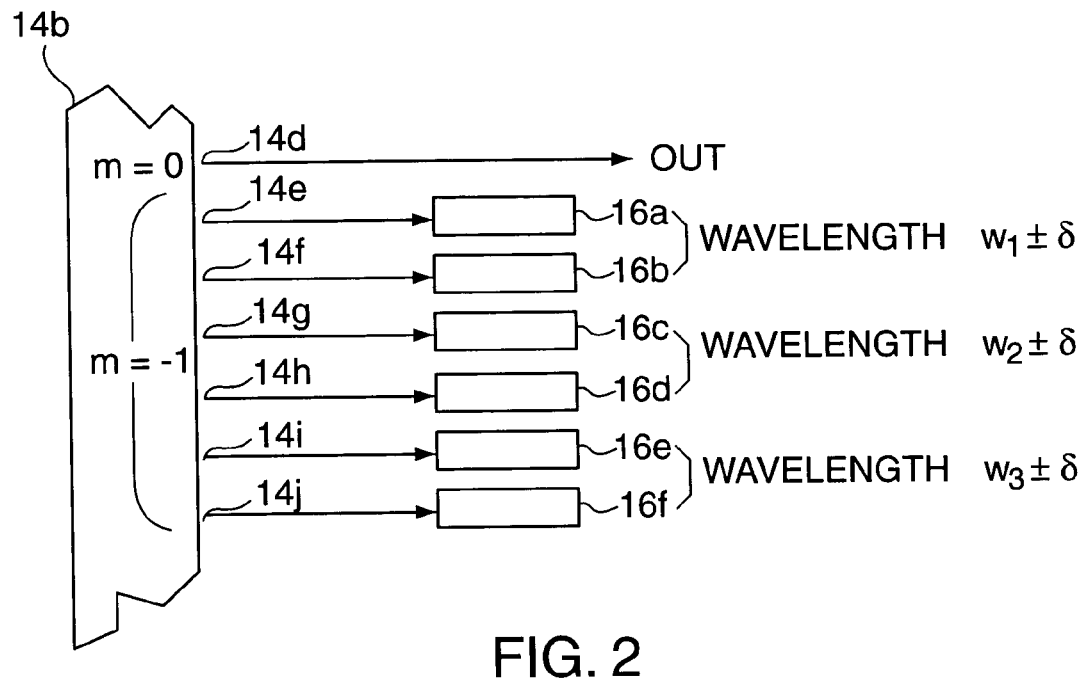
FIG. 2 is an exemplary enlarged portion of a free propagation region (FPR) and outputs thereof for an exemplary optical wavelength locking arrangement of FIG. 1 in accordance with a first concept of the first embodiment of the present invention.

Referring now to FIG. 2, there is shown an exemplary enlarged portion of the second free propagation region (FPR) 14b and the outputs of the wavelocker 11 of FIG. 1 when lasers 12a, 12b, and 12c (shown in FIG. 1) generate widely spaced wavelength channels in accordance with a first concept of the first embodiment of the present invention. The output at output port 14d of the second FPR 14b corresponds to the location of the zeroth diffraction order (m=0) of the first FPR 14a, the array waveguide 14c, and the second FPR 14b, and provides the multiplexed output wavelength channels of the lasers 12a, 12b, and 12c as the output from the wavelocker 11. The first FPR 14a, second FPR 14b, and the arrayed grating waveguides 14c (shown in FIG. 1) are designed to resolve the wavelength channel output signals from the lasers 12a, 12b, and 12c (shown in FIG. 1) at, for example, separate distinct locations within the m=−1 diffraction order area of the second FPR 14b. Where the wavelength channel signals from the lasers 12a, 12b, and 12c cannot be resolved sufficiently in the m=−1 and/or m=+1 diffraction order areas, such wavelength channel signals may be resolved in a higher non-zero diffraction order as, for example, m=±2, m=±3, etc. When a higher diffraction order is used, less resolved power will be found in the signals from the lasers 12a, 12b, and 12c. It is assumed hereinafter for this embodiment that the wavelength channel signals from the lasers 12a, 12b, and 12c are resolvable within the m=+1 and/or m=−1 diffraction order areas of the second FPR 14b.

As seen in FIG. 2, first and second radiation detection devices 16a and 16b are coupled to output ports 14e and 14f, respectively, within the m=−1 diffraction order area of the second FPR 14b. The output ports 14e and 14f are closely positioned at the output side of the second FPR 14b for receiving the resolved wavelength signals wavelength1+δ and wavelength1−δ, respectively, from the laser 12a, where the indicated wavelength ($W_1$) is the wavelength from the laser 12a and "δ" is a slight deviation from the indicated wavelength ($W_1$) from the laser 12a. The output ports 14e and 14f are positioned to receive predetermined ratio of wavelength1+δ and wavelength1−δ signals when the laser 12a is locked to its predetermined wavelength. Third and fourth radiation detection devices 16c and 16d are coupled to output ports 14g and 14h, respectively, within the m=−1 diffraction order area of the FPR 14b for receiving the resolved wavelength signals wavelength2+δ and wavelength2−δ, respectively, from the laser 12b. The output ports 14g and 14h are positioned to receive predetermined ratio of wavelength2+δ and wavelength2−δ signals from the laser 12b when the laser 12b is locked to its predetermined wavelength. Fifth and sixth radiation detection devices 16e and 16f are coupled to output ports 14i and 14j, respectively, within the m=1 diffraction order area of the FPR 14b for receiving wavelength signals wavelength3+δ and wavelength3−δ, respectively, from the third laser 12c. The output ports 14i and 14j are positioned to receive predetermined ratio of wavelength3+δ and wavelength3−δ signals from the laser 12c when the laser 12c is locked to its predetermined wavelength. The above description for the signals obtained at each of the paired output ports 14e-14f, 14g-14h, and 14i-14j is more clearly shown in the graph of FIG. 3.

Figure 3:
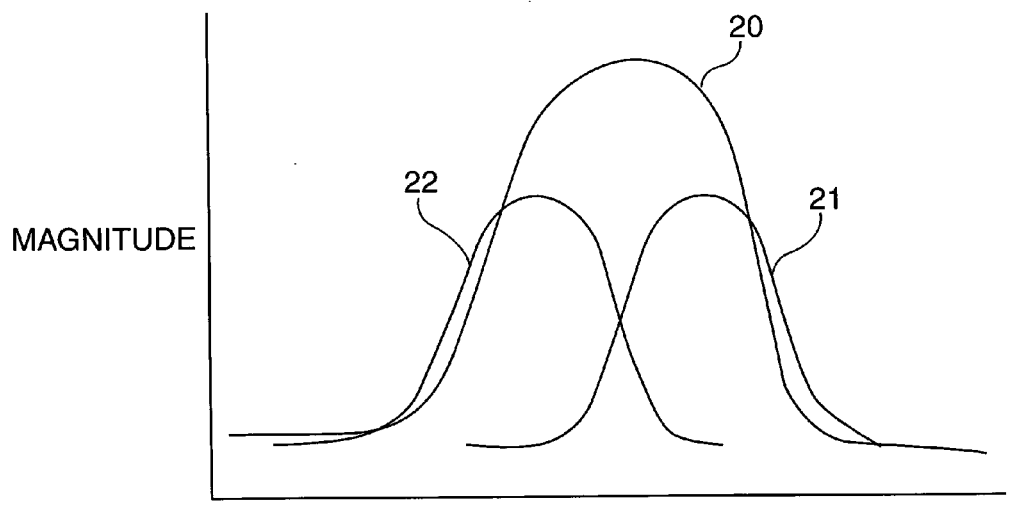
FIG. 3 is a graph of wavelength on the X-axis versus magnitude on the Y-axis showing exemplary signal outputs from waveguides positioned at a zero diffraction order output and at two outputs within a predetermined non-zero diffraction order output area in accordance with the characteristics shown in FIG. 2.

Referring now to FIG. 3, there is shown a graph of wavelength on the x-axis vs magnitude on the y-axis. A curve 20 represents an exemplary spectral response received in the m=0 diffraction order and curves 21 and 22 represent exemplary spectral responses for the corresponding non-zero diffraction order outputs (wavelengthx+δwavelength) and (wavelengthx ≤ δwavelength) or (wavelengthx−δwavelenth) and (wavelengthx+δwavelength) respectively for spectral signals entering the ports labeled Laser X in FIG. 1 where X is represented as 1, 2 or 3 in FIG. 1. The filter response curves 21 and 22 for the first laser 12a are those obtained at the output ports 14e and 14f, respectively, of the second FPR 14b shown in FIG. 2 and detected by the respective radiation detectors 16a and 16b. In a similar manner, the filter response curves 21 and 22 for the second laser 12b are those obtained at the output ports 14g and 14h, respectively, of the second FPR 14b and detected by the respective radiation detectors 16c and 16d. The filter response curves 21 and 22 for the laser 12c might be those obtained at the output ports 14i and 14j, respectively, of the second FPR 14b and detected by the respective radiation detectors 16e and 16f.

The radiation detectors 16a–16f each detect the magnitude of the radiation obtained from the associated m=−1 non-zero diffraction order output ports 14e–14j, respectively, and generate an electrical output control signal for use in the Control device 18 (shown in FIG. 1) for locking the wavelength of the associated one of the lasers 12a–12c. The control device 18 compares the magnitudes of the electrical output control signals from, for example, the radiation detectors 16a and 16b, and generates an output control signal to the associated first laser 12a when a wavelength shift is detected in order to lock the first laser 12a to its predetermined wavelength. The output control signal to the laser could include a signal to change laser current and/or laser temperature, thereby changing the laser output wavelength. Alternatively, correspondingly located output ports (not shown) in an m=+1 diffraction order can be used in place of the output ports 14e and 14j located in the m=−1 diffraction order shown in FIG. 2 for detecting output signals from lasers 12a–12c in the manner described hereinbefore for the output ports 14e–14j.

Referring now to FIG. 4, there is shown an exemplary enlarged portion of the second free propagation region (FPR) 14b at the output of the optical wavelength locking arrangement 10 of FIG. 1 in accordance with a second concept of the first embodiment of the present invention. There, the zero diffraction order output port 14d from the second FPR 14b provides the multiplexed wavelength signals from the lasers 12a–12c to the output of the wavelocker 11 of FIG. 1. The diffracted wavelength output signals wavelengthx+δ and wavelengthx−δ for each of the lasers 12a–12c are taken, for example, from the m=+1 and m=−1 diffraction orders, respectively, where x=1, 2, or 3 represent the diffracted wavelength signals from the first laser 12a, second laser 12b, and third laser 12c, respectively, at the output side of the second FPR 14b.

More particularly, the output ports 14k and 14l are related to the m=+1 and m=−1 diffraction orders, respectively, and are located at the output side of the second FPR 14b to provide the power in the symmetric diffracted wavelength output signals wavelength1+δ and wavelength1−δ, respectively, from the first laser 12a to the respective radiation detectors 16a and 16b. Alternatively, the output ports 14k and 14l can be located to obtain the symmetric diffracted wavelength output signals wavelength1−δ ($W_1$−δ) and wavelength1+δ ($W_1$+δ), respectively, from the first laser 12a for transmission to the respective radiation detectors 16a and 16b. Similarly, the output ports 14m and 14n are related to the symmetric m=+1 and m=−1 diffraction orders, respectively, and provide the symmetric diffracted wavelength output signals wavelength2+δ and wavelength2−δ, respectively, (or alternatively symmetric diffracted wavelength output signals wavelength2−δ and wavelength2+δ) from the second laser 12b to the respective radiation detectors 16c and 16d. In a same manner, the output ports 14p and 14q are related to the m=+1 and m=−1 diffraction orders, respectively, and provide the symmetric diffracted wavelength output signals wavelength3+δ and wavelength3−δ respectively, (or alternatively symmetric diffracted wavelength output signals wavelength3−δ and wavelength3+δ) from the third laser 12c to the respective radiation detectors 16e and 16f. The paired output ports 14k-14l, 14m-14n, and 14p-14q provide resolved spectral response from the lasers 12a, 12b, and 12c, respectively, in the manner shown by the curves 21 and 22 of FIG. 3. Similarly, the radiation detectors 16a, 16b, 16c, 16d, 16e, and 16f each detect the magnitude of the radiation obtained from the associated non-zero diffraction order output ports 14k, 14l, 14m, 14n, 14p, and 14q, respectively, and generate an electrical output control signal to the Control device 18 (shown in FIG. 1) for stabilizing the associated one of the lasers 12a, 12b, and 12c. The control device 18 compares the magnitudes of the electrical output control signals from, for example, the radiation detectors 16a and 16b, and generates an output control signal to the first laser 12a when a wavelength shift is detected in order to stabilize the first laser 12a to its predetermined wavelength.

Figure 5:
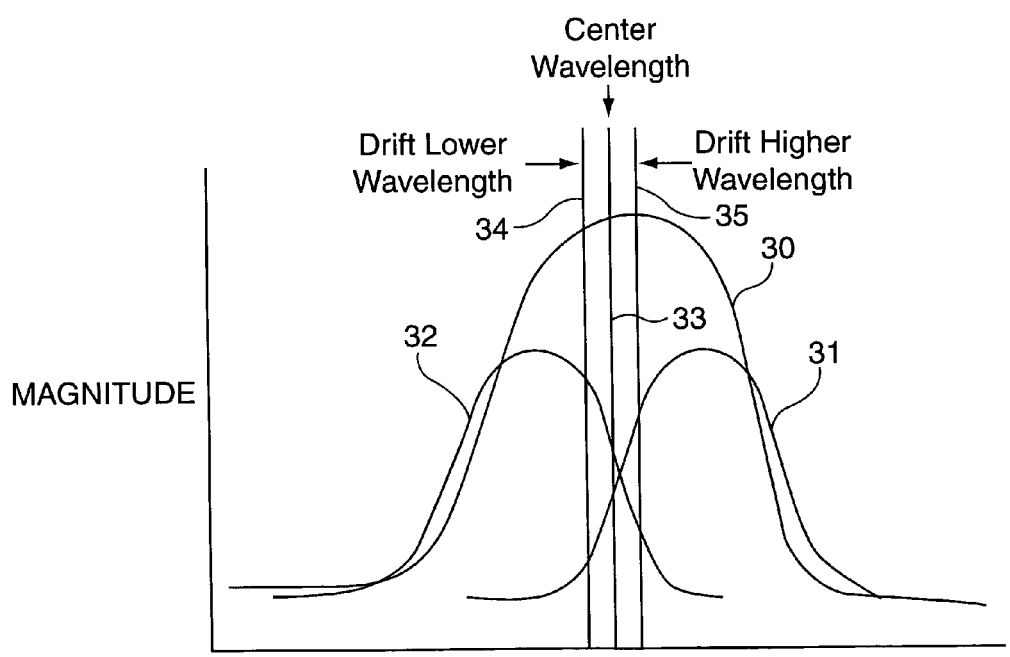
FIG. 5 is a graph of wavelength on the X-axis versus magnitude on the Y-axis for a locking technique for determining a wavelength shift for a radiation source using inputs in accordance with the characteristics shown in FIG. 4.
Figure 6:
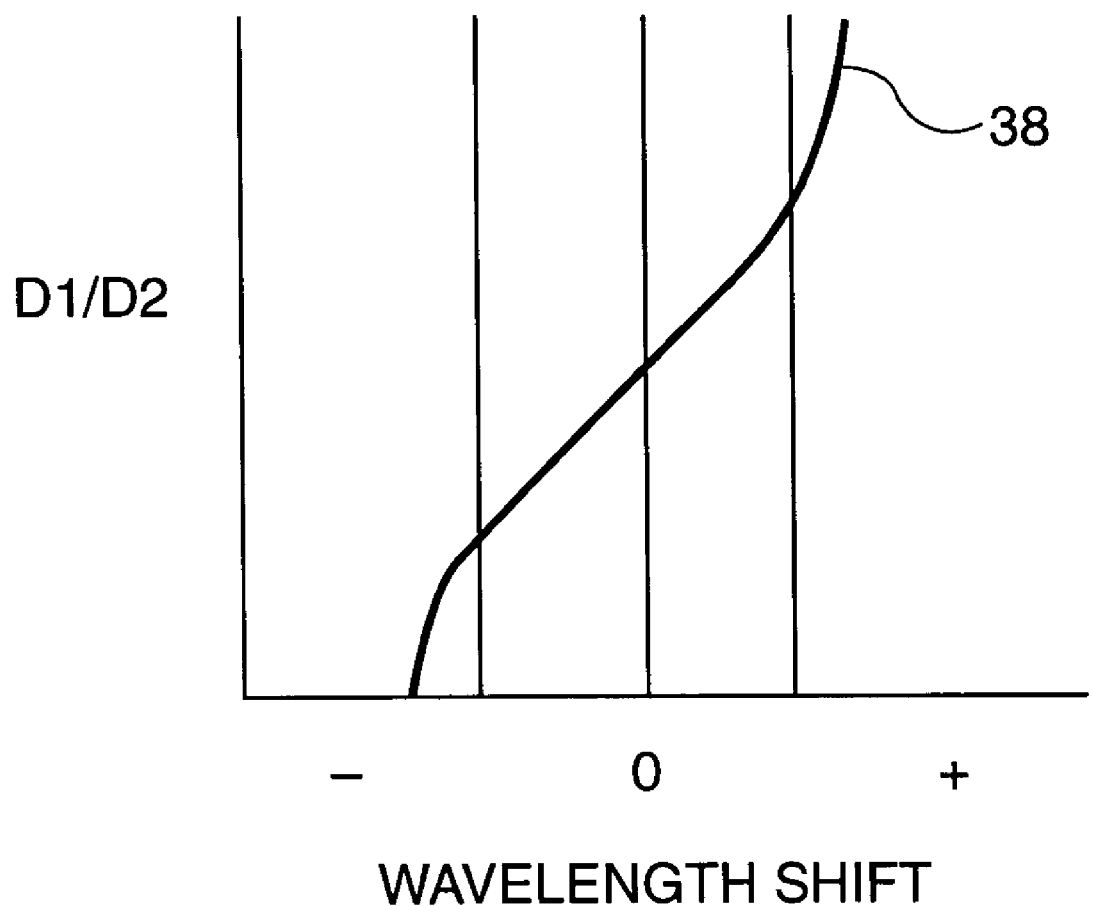
FIG. 6 is a graph of wavelength shift on the X-axis versus a ratio of two radiation detectors on the Y-axis for providing wavelength locking on a radiation source generating a predetermined wavelength shown in the graph of FIG. 5.

Referring now to FIGS. 5 and 6, FIG. 5 shows a graph of wavelength on the X-axis versus magnitude on the Y-axis for curves 30, 31, and 32 for determining wavelength shifts for any one of the lasers 12a, 12b, and 12c using inputs from the paired radiation detectors 16a-16b, 16c-16d, and 16e-16f, respectively, shown in FIGS. 2 and 4 for illustrating the wavelocking technique of the present invention. The following discussion is directed specifically to the functioning of radiation detectors 16a and 16b associated with the first laser 12a, but such discussion is similarly applicable for the functioning of paired radiation detectors 16c and 16d associated with second laser 12b, and paired radiation detectors 16e and 16f associated with third laser 12c.

Curve 30 represents an exemplary spectral response curve given a broadband source input through the waveguide between Laser 1 and the Arrayed Waveguide Grating output port 14d of the FPR 14b. Response curves 31 and 32 are the spectral response curves from the respective wavelength1+δ and wavelength1−δ channel output ports 14e and 14f in FIG. 2, or the output ports 14k and 14l in FIG. 4. When the wavelength channel of the first laser 12a is stabilized at its desired frequency, the radiation detectors 16a and 16b will generate approximately equal electrical output signals to the control device 18, as is shown by the curves 31 and 32, having equal magnitudes where they meet at a line 33 designated "Center Wavelength" for the wavelength channel. If, for example, the first laser 12a were to drift from its desired wavelength channel frequency to a lower wavelength, as shown by the line 34 designated "Drift Lower Wavelength", then the radiation detector 16b generates a higher magnitude output signal (where response curve 32 intersects line 34) than the magnitude of the output signal from the radiation detector 16a (where response curve 31 intersects line 34). Alternatively, if the first laser 12a were to drift from its desired wavelength channel frequency to a higher wavelength, as shown by line 35 designated "Drift Higher Wavelength", then the radiation detector 16a generates a higher magnitude output signal (where response curve 31 intersects line 35) than magnitude of the output signal from the radiation detector 16b (where response curve 32 intersects line 35).

Referring now to FIG. 6, there is shown a graph of Wavelength Shift on the X-axis versus Detector Ratio (D1/D2) on the Y-axis for a curve 38 for the exemplary radiation detector pair 16a and 16b to further illustrate the wavelocking technique illustrated by FIG. 5 in accordance with the present invention. Depending on the detector ratio (D1/D2) of the output signals from the radiation detectors 16a and 16b, the response curve 38 goes from a low ratio value at negative wavelength shifts (where detector 16b generates a higher magnitude output signal than detector 16a) to higher ratio values as the wavelength shift proceeds through a zero wavelength shift (where first laser 12a is stabilized) to positive wavelength shifts (where detector 16a generates a higher magnitude output signal than detector 16b). A control device 18 (shown in FIG. 1) responds to such changes in detector ratios to generate output control signals to the first laser 12a to "lock" the wavelength thereof. Generally, this is done appropriately by whatever technique is used to tune the wavelength of the laser to its desired value. Typically this is done by control of the temperature of the laser 12a, or alternatively by control of the current flow through the laser 12a as is known in the art. The above description is also applicable for the functioning of paired radiation detectors 16c and 16d associated with the laser 12b, and paired radiation detectors 16e and 16f associated with the laser 12c.

Figure 7:
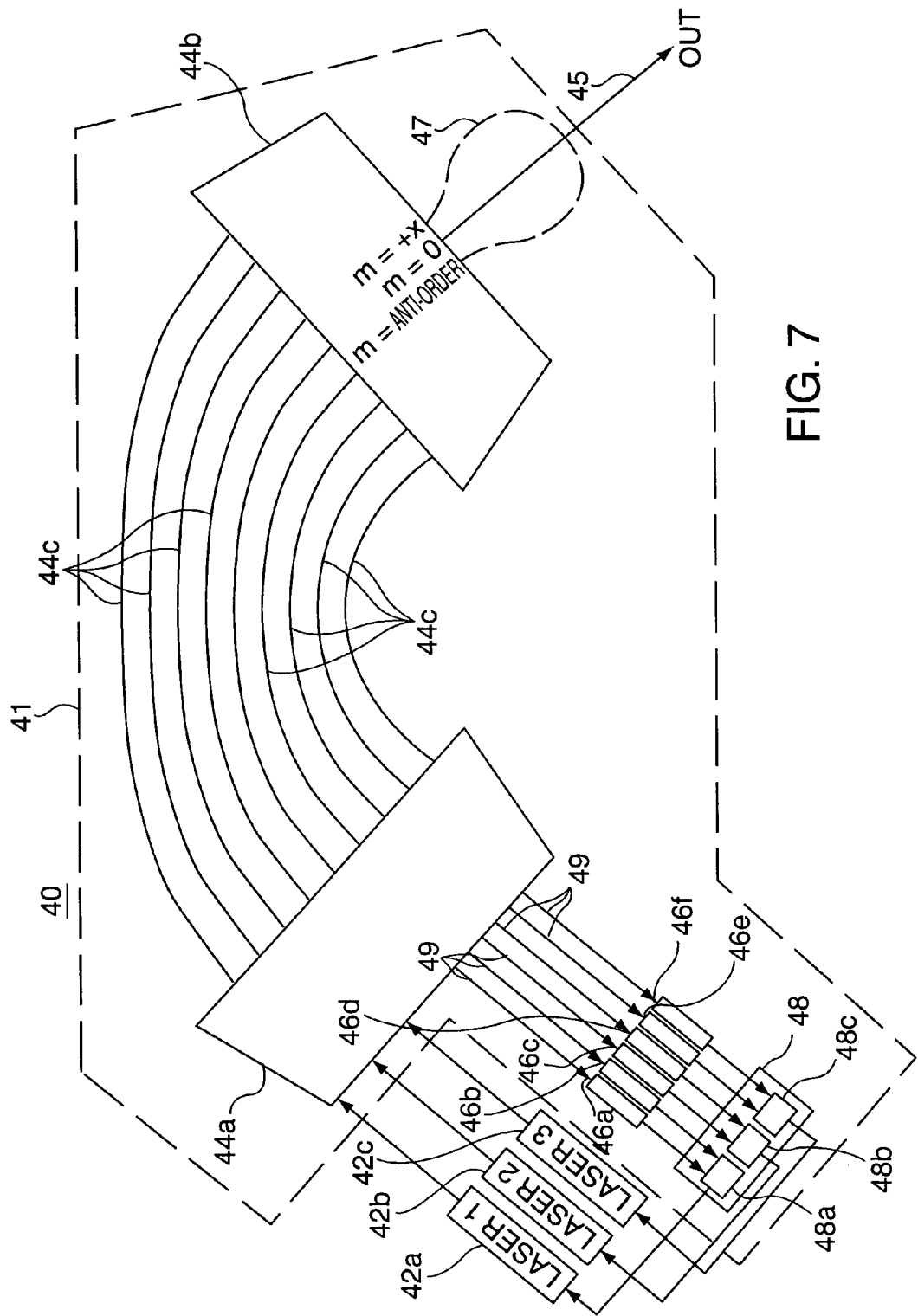
FIG. 7 is a schematic diagram of an optical wavelength locking arrangement in accordance with a second embodiment of the present invention.

Referring now to FIG. 7, there is shown a schematic diagram of a transmitter 40 comprising a plurality of radiation sources (LASER 1, LASER 2, LASER 3) (of which exemplary lasers 42a, 42b, and 42c are shown), and an exemplary optical wavelength locking arrangement (hereinafter wavelocker) 41 (shown within a dashed line area) in accordance with a second embodiment of the present invention. The wavelocker 41 comprises a first Free Propagation Region (FPR) 44a, a second FPR 44b, an optical grating section formed from a plurality of different length waveguides 44c, a plurality of radiation detectors 46a, 46b, 46c, 46d, 46e, and 46f, a feedback loop 47 (shown as a dashed line), and a control device 48. Each of the plurality of lasers 42a, 42b, and 42c are arranged to generate a different predetermined wavelength output signal. The arrangement of the wavelocker 41 is especially useful when densely spaced output wavelength channels are generated by the lasers 42a, 42b, and 42c. The densely spaced output wavelength signals from the lasers 42a, 42b, and 42c are coupled to separate predetermined inputs of the first FPR 44a. The first and second FPRs 44a and 44b, and the plurality of waveguides 44c, forms an Array Waveguide Grating (AWG) Multiplexer/Demultiplexer (wavelocker 41) which utilizes the principle of diffraction of phase shifted signals to multiplex or demultiplex optical signals as was described hereinbefore for the first and second FPRs 14a and 14b, and the plurality of waveguides 14c of the wavelocker 11 of FIG. 1.

In the wavelocker 41, densely spaced multiple input signals from the lasers 42a, 42b, and 42c are positioned on a waveguide slab forming the first FPR 44a in such a way that after propagating through the waveguide slab, the array of waveguides 44c with off-set lengths, and a second waveguide slab forming the second FPR 44b, a zeroth diffraction order (m=0) of all multiplexed input wavelength signals coincides with an output waveguide 45. Whereas most of the power is found in the zeroth diffraction order (m=0), as discussed earlier, some power resides in the non-zero diffraction orders of m=−1, m−+1, m=−2, m=+2, etc. which are offset from the zeroth diffraction order (m=0). With densely spaced wavelength channels, lower symmetrical non-zero diffraction orders (e.g., m=1, 2, or 3) do not sufficiently resolve the wavelengths (and wavelengths±δ) in the manner discussed earlier in connection with FIG. 2 or 4 because the multiplexed wavelength channels are too close to each other.

In accordance with the second embodiment of the present invention, a feedback loop 47 is coupled between a first predetermined non-zero diffraction order (m=+x or m=−x), and a location on the output side of the free propagation region 44b that does not correspond to a specific diffraction order (i.e., an anti-order) of the AWG Multiplexer/Demultiplexer 41 via a feedback loop 47. As a result, the multiplexed signals from the lasers 42a, 42b, and 42c appearing, to some extent, at, for example, the m=+1 non-zero output port are fed back via the feedback loop 47 into the second FPR 44b via an anti-order port for transmission back through both the array of waveguides 44c and the first FPR 44a. In propagating back through the second FPR 44b, the waveguides 44c, and the first FPR 44a, the originally multiplexed wavelength signals are demultiplexed to unique input focus positions on the first FPR 44a that are not overlapping either with each other or with the input ports from the lasers 44a, 44b, and 44c. A separate one of an added plurality of position collection waveguides 49 is coupled to each of the positions where the symmetric wavelengths wavelength1+δ, wavelength1−δ, wavelength2+δ, wavelength2−δ, wavelength3+δ, and wavelength3−δ are resolved on the FPR 44a. Each of the collection waveguides 49 is coupled to an input of a separate one of the radiation detectors 46a–46f.

Of these, the radiation detectors 46a and 46b are coupled to receive the wavelength1+δ and wavelength1−δ, respectively, associated with the first laser 42a, the radiation detectors 46c and 46d are coupled to receive the wavelength2+δ and wavelength2−δ, respectively, associated with the second laser 42b, and the radiation detectors 46e and 46f are coupled to receive the wavelength3+δ and wavelength3−δ, respectively, associated with the third laser 42a. Outputs from the radiation detectors 46a–46f are coupled to the control device 48 such that output signals from the radiation detectors 46a and 46b are compared in a control subsection 48a of the control device 48 in the manner described hereinbefore in relation to FIGS. 5 and 6. Similarly, output signals from the radiation detectors 46c and 46d are compared in a control subsection 48b of the control device 48, and output signals from the radiation detectors 46e and 46f are compared in a control subsection 48c of the control device 48. The control subsections 48a, 48b, and 48c are responsive to predetermined differences in the input signals from the associated pair of radiation detectors 46a–46b, 46c–46d, and 46e–46f, respectively, for generating a separate control signal to the respective lasers 42a, 42b, and 42c for locking the wavelengths of the lasers 42a, 42b, and 42c as was described hereinbefore for FIG. 6.

Advantages of the present invention are (1) a combination of multiplexing and wavelength locking of multiple radiation sources is achieved without the requirement of source modulation, and (2) angular dispersion characteristics of gratings are utilized as part of a detection technique for the magnitude and direction of wavelength drift.

It is to be appreciated and understood that the specific embodiments of the present invention that have been described are merely illustrative of the general principles of the present invention. Various modifications may be made by those skilled in the art that are consistent with the principles of the invention set forth. For example, various types of gratings can be used such as an Arrayed Waveguide Grating (AWG), a Bulk grating, an Echelle grating, etc. Additionally, various techniques are feasible for using the difference resulting in the symmetry of the detected signals to correct for any drift of the wavelengths of the radiation sources from their desired values. Still further, the present invention can be applied to radiation sources which have different polarizations and/or wavelengths.

What is claimed is:

1. An arrangement for wavelength locking each of a single or plurality of radiation sources that generate separate wavelength output signals, the arrangement comprising:

a multiplexing/demultiplexing grating device for receiving the separate wavelength output signals from the plurality of radiation sources and generating a multiplexed wavelength output signal from the arrangement at a zero diffraction order output port of the grating device, and symmetric wavelength+δ and wavelength−δ output signals for each radiation source that are resolved at at least one separate predetermined location of a non-zero diffraction order of the grating device;

a plurality of radiation detectors, each radiation detector being coupled to receive a separate one of the symmetric wavelength+δ and wavelength−δ output signals from a separate one of the plurality of radiation sources, and to generate an output signal representing the magnitude of the received wavelength output signal; and a control device responsive to output signals from each pair of radiation detectors that are coupled to receive the separate wavelength+δ and wavelength−(Š output signals from a separate predetermined one of the plurality of radiation sources, for utilizing a signal ratio of the separate wavelength+δ and wavelength−δ output signals and generating therefrom a separate output control signal to each one of the plurality of radiation sources for locking the separate wavelength output signal thereof to a desired wavelength value.

2. The wavelength locking arrangement of claim 1 wherein the multiplexing/demultiplexing grating device is formed from one of a group consisting of an Array Waveguide Grating, a bulk grating, and an Echelle grating.

3. The wavelength locking arrangement of claim 1 wherein the multiplexing/demultiplexing grating device is an Array Waveguide Grating comprising:
   a first Free Propagation Region (FPR) for receiving the separate wavelength output signals from the plurality of radiation sources at an input side thereof;
   a second FPR comprising an input and an output side thereof; and
   a grating array comprising a plurality of different-length optical waveguides coupling the output side of the first FPR and the input side of the second FPR for causing the second FPR to generate the multiplexed wavelength output signal from the plurality of radiation sources at the zero diffraction order output port at the output side thereof, and resolving the separate wavelength+δ and wavelength−δ output signals at separate predetermined locations of at least one predetermined non-zero diffraction order output at the output side thereof.

4. The wavelength locking arrangement of claim 3 wherein the separate wavelength+δ and wavelength−δ output signals from all of the plurality of radiation sources are resolved at separate predetermined locations within a single predetermined non-zero diffraction order output area.

5. The wavelength locking arrangement of claim 3 wherein the separate wavelength+δ output signals from all of the plurality of radiation sources are resolved at separate predetermined locations within a single predetermined non-zero diffraction order output area, and wavelength−δ output signals from all of the plurality of radiation sources are resolved at separate predetermined locations within a different single predetermined non-zero diffraction order output area.

6. The wavelength locking arrangement of claim 1 wherein the multiplexing/demultiplexing grating device is an Array Waveguide Grating comprising:
   a first Free Propagation Region (FPR) for receiving the separate wavelength output signals from the plurality of radiation sources at an input side thereof;
   a second FPR comprising an input and an output side thereof, the output side comprising a feedback loop between a predetermined non-zero diffraction order output and an anti-order output; and
   a grating array comprising a plurality of different-length optical waveguides coupling the output side of the first FPR and the input side of the second FPR for causing the second FPR to generate the multiplexed wavelength output signal from the plurality of radiation sources at the zero diffraction order output and a predetermined non-zero diffraction order output, and the separate wavelength+δ and wavelength−δ output signals are resolved at separate predetermined locations at the input side of the first FPR that are separate from the locations of the inputs from the plurality of radiation sources after being fed back through the second FPR, the grating array, and the first FPR.

7. The wavelength locking arrangement of claim 1 wherein the control device compares the output signals from each pair of radiation detectors coupled to receive the separate wavelength+δ and wavelength−δ output signals from a separate predetermined radiation source for detecting a wavelength shift in the predetermined radiation source and generating an output control signal to the predetermined radiation source in response to a detected wavelength shift for changing one of a group consisting of a current and a temperature of the predetermined radiation source for locking the wavelength thereof.

8. An optical device comprising:
   a plurality of radiation sources each for radiating light of a different assigned wavelength; and
   means for locking the wavelength of the radiation sources to the assigned value comprising:
   a multiplexing/demultiplexing grating device for receiving the separate wavelength output signals from the plurality of radiation sources and generating a multiplexed wavelength output signal from the arrangement at a zero diffraction order output port of the grating device, and symmetric wavelength+δ and wavelength−δ output signals for each radiation source that are resolved at separate predetermined locations of a non-zero diffraction order of the grating device;
   a plurality of radiation detectors, each radiation detector being coupled to receive a separate one of the symmetric wavelength+δ and wavelength−δ output signals from a separate one of the plurality of radiation sources, and to generate an output signal representing the magnitude of the received wavelength output signal; and
   a control device responsive to output signals from each pair of radiation detectors that are coupled to receive the separate wavelength+δ and wavelength−δ output signals from a separate predetermined one of the plurality of radiation sources, for utilizing a signal ratio of the separate wavelength+δ and wavelength−δ output signals and generating therefrom a separate output control signal to each one of the plurality of radiation sources for locking the separate wavelength output signal thereof to a desired wavelength value.

9. The optical device of claim 8 wherein the multiplexing/demultiplexing grating device of the wavelength locking means is formed from one of a group consisting of an Array Waveguide Grating, a bulk grating, and a Echelle grating.

10. The optical device of claim 8 wherein the multiplexing/demultiplexing grating device of the wavelength locking means is an Array Waveguide Grating comprising:
    a first Free Propagation Region (FPR) for receiving the separate wavelength output signals from the plurality of radiation sources at an input side thereof;
    a second FPR comprising an input and an output side thereof; and
    a grating array comprising a plurality of differently spaced optical waveguides coupling the output side of the first FPR and the input side of the second FPR for causing the second FPR to generate the multiplexed wavelength output signal from the plurality of radiation sources at the zero diffraction order output port at the output side thereof, and resolving the separate symmetric wavelength+δ and wavelength−δ output signals at separate predetermined locations of at least one predetermined non-zero diffraction order output at the output side thereof.

11. The optical device of claim 10 wherein, in the wavelength locking means, the separate symmetric wavelength+δ and wavelength−δ output signals from all of the plurality of radiation sources are resolved at separate predetermined locations within a single predetermined non-zero diffraction order output area.

12. The optical device of claim 10 wherein in the wavelength locking means, the separate wavelength+δ output signals from all of the plurality of radiation sources are resolved at separate predetermined locations within a single predetermined non-zero diffraction order output area on a first side of the zero diffraction order port, and wavelength−δ output signals from all of the plurality of radiation sources are resolved at separate predetermined locations within a single predetermined non-zero diffraction order output area on a second opposite side of the zero diffraction order port.

13. The optical device of claim 8 wherein the multiplexing/demultiplexing grating device of the wavelength locking means is an Array Waveguide Grating comprising:
   a first Free Propagation Region (FPR) for receiving the separate wavelength output signals from the plurality of radiation sources at an input side thereof;
   a second FPR comprising an input and an output side thereof, the output side comprising a feedback loop between a non-zero diffraction order output and an anti-order output; and
   a grating array comprising a plurality of differently spaced optical waveguides coupling the output side of the first FPR and the input side of the second FPR for causing the second FPR to generate the multiplexed wavelength output signal from the plurality of radiation sources at the zero diffraction order output and at the predetermined non-zero diffraction order outputs, and resolving the separate symmetric wavelength+δ and wavelength−δ output signals at separate predetermined locations at the input side of the first FPR that are separate from the locations of the inputs from the plurality of radiation sources after being fed back through the second FPR, the grating array, and the first FPR.

14. The optical device of claim 8 wherein the control device of the wavelength locking means compares the output signals from each pair of radiation detectors coupled to receive the separate symmetric wavelength+δ and wavelength−δ output signals from a separate predetermined radiation source for detecting a wavelength shift in the predetermined radiation source and generating an output control signal to the predetermined radiation source in response to a detected wavelength shift for changing one of a group consisting of a current and a temperature of the predetermined radiation source for locking the wavelength thereof.

15. A method of wavelength locking each of a plurality of radiation sources that generate separate wavelength output signals comprising the steps of:
   (a) receiving the wavelength output signals from the plurality of radiation sources in a multiplexing/demultiplexing grating device for generating a multiplexed wavelength output signal at a zero diffraction order output port of the grating device, and generating separate symmetric wavelength+δ and wavelength−δ output signals for each radiation source that are resolved at separate predetermined locations of a predetermined non-zero diffraction order of the grating device;
   (b) receiving each one of the symmetric wavelength+δ and wavelength−δ output signals from the plurality of radiation sources at a separate one of a plurality of radiation detectors;
   (c) generating an output signal at each radiation detector representing the magnitude of the received wavelength output signal; and
   (d) generating separate output control signals from a control device in response to the output signals from each pair of radiation detectors that are coupled to receive the separate symmetric wavelength+δ and wavelength−δ output signals from a separate predetermined radiation source for locking the wavelength of each of the predetermined radiation sources.

16. The method of claim 15 wherein in performing step (a), performing the substeps of:
   (a1) receiving the separate wavelength output signals from the plurality of radiation sources at an input side of a first Free Propagation Region (FPR); and
   (a2) propagating the wavelength output signals from the plurality of radiation sources through the first FPR, a second FPR, and a grating array comprising a plurality of differently spaced optical waveguides coupling an output side of the first FPR and an input side of the second FPR for causing the second FPR to generate the multiplexed wavelength output signal from the plurality of radiation sources at a zero diffraction order output port, and the separate symmetric wavelength+δ and wavelength−δ output signals at separate predetermined locations of at least one predetermined non-zero diffraction order output at the output side thereof.

17. The method of claim 16 wherein in step (a2), the separate symmetric wavelength+δ and wavelength−δ output signals from all of the plurality of radiation sources are resolved at separate predetermined locations within a single predetermined non-zero diffraction order output area.

18. The method of claim 16 wherein in step (a2), the separate wavelength+δ output signals from all of the plurality of radiation sources are resolved at separate predetermined locations within a single predetermined non-zero diffraction order output area on a first side of the zero diffraction order port, and the wavelength−δ output signals from all of the plurality of radiation sources are resolved at separate predetermined locations within a single predetermined non-zero diffraction order output area on a second opposite side of the zero diffraction order port.

19. The method of claim 15 wherein in performing step (a), performing the substeps of:
   (a1) receiving the separate wavelength output signals from the plurality of radiation sources at an input side of a first Free Propagation Region (FPR);
   (a2) propagating the wavelength output signals from the plurality of radiation sources through the first FPR, a second FPR, and a grating array comprising a plurality of differently spaced optical waveguides coupling an output side of the first FPR and an input side of the second FPR for causing the second FPR to generate the multiplexed wavelength output signal from the plurality of radiation sources at a zero diffraction order output port and at a predetermined non-zero diffraction order output;
   (a3) feeding the multiplexed wavelength output signal back into the second FPR via a feedback loop coupling the predetermined non-zero diffraction order output and the anti-order output; and
   (a4) recovering the separate symmetric wavelength+δ and wavelength−δ output signals that are resolved at separate predetermined locations at the input side of the first FPR that are separate from the locations of the inputs from the plurality of radiation sources after being fed back through the second FPR, the grating array, and the first FPR.

20. The method of claim 15 wherein in performing step (d), performing the substeps of:
(c1) comparing the output signals from each pair of radiation detectors that are coupled to receive the separate wavelength+δ and wavelength−δ output signals from a separate predetermined radiation source in the control device;
(c2) detecting a wavelength shift in the predetermined radiation source in response to the received wavelength+δ and wavelength−δ output signals; and
(c3) generating an output control signal to the predetermined radiation source in response to a detected wavelength shift for changing one of a group consisting of a current and a temperature of the predetermined radiation source for locking the wavelength thereof.

21. A method of wavelength locking a plurality of wavelengths generated by a corresponding plurality of radiation sources of an optical device comprising the steps of:
(a) receiving the wavelength output signals from the plurality of radiation sources in a multiplexing/demultiplexing grating device for generating a multiplexed wavelength output signal at a zero diffraction order output port of the grating device, and generating separate symmetric wavelength+δ and wavelength−δ output signals for each radiation source that are resolved at separate predetermined locations of a predetermined non-zero diffraction order of the grating device;
(b) receiving each one of the symmetric wavelength+δ and wavelength−δ output signals from the plurality of radiation sources at a separate one of a plurality of radiation detectors;
(c) generating an output signal at each radiation detector representing the magnitude of the received wavelength output signal; and
(d) generating separate output control signals from a control device in response to the output signals from each pair of radiation detectors that are coupled to receive the separate symmetric wavelength+δ and wavelength−δ output signals from a separate predetermined radiation source for locking the wavelength of each of the predetermined radiation sources.

22. The method of claim 21 wherein in performing step (a), performing the substeps of:
(a1) receiving the separate wavelength output signals from the plurality of radiation sources at an input side of a first Free Propagation Region (FPR); and
(a2) propagating the wavelength output signals from the plurality of radiation sources through the first FPR, a second FPR, and a grating array comprising a plurality of differently spaced optical waveguides coupling an output side of the first FPR and an input side of the second FPR for causing the second FPR to generate the multiplexed wavelength output signal from the plurality of radiation sources at a zero diffraction order output port, and the separate symmetric wavelength+δ and wavelength−δ output signals at separate predetermined locations of at least one predetermined non-zero diffraction order output at the output side thereof.

23. The method of claim 22 wherein in step (a2), the separate symmetric wavelength+δ and wavelength−δ output signals from all of the plurality of radiation sources are resolved at separate predetermined locations within a single predetermined non-zero diffraction order output area.

24. The method of claim 22 wherein in step (a2), the separate wavelength+δ output signals from all of the plurality of radiation sources are resolved at separate predetermined locations within a single predetermined non-zero diffraction order output area on a first side of the zero diffraction order port, and the wavelength−δ output signals from all of the plurality of radiation sources are resolved at separate predetermined locations within a single predetermined non-zero diffraction order output area on a second opposite side of the zero diffraction order port.

25. The method of claim 21 wherein in performing step (a), performing the substeps of:
(a1) receiving the separate wavelength output signals from the plurality of radiation sources at an input side of a first Free Propagation Region (FPR);
(a2) propagating the wavelength output signals from the plurality of radiation sources through the first FPR, a second FPR, and a grating array comprising a plurality of differently spaced optical waveguides coupling an output side of the first FPR and an input side of the second FPR for causing the second FPR to generate the multiplexed wavelength output signal from the plurality of radiation sources at a zero diffraction order output port and a predetermined non-zero diffraction order output;
(a3) feeding the multiplexed wavelength output signal back into the second FPR via a feedback loop coupling the predetermined non-zero diffraction order output and the anti-order output; and
(a4) recovering the separate symmetric wavelength+δ and wavelength−δ output signals that are resolved at separate predetermined locations at the input side of the first FPR that are separate from the locations of the inputs from the plurality of radiation sources after being fed back through the second FPR, the grating array, and the first FPR.

26. The method of claim 21 wherein in performing step (d), performing the substeps of:
(c1) comparing the output signals from each pair of radiation detectors that are coupled to receive the separate wavelength+δ and wavelength−δ output signals from a separate predetermined radiation source in the control device;
(c2) detecting a wavelength shift in the predetermined radiation source in response to the received wavelength+δ and wavelength−δ output signals; and
(c3) generating an output control signal to the predetermined radiation source in response to a detected wavelength shift for changing one of a group consisting of a current and a temperature of the predetermined radiation source for locking the wavelength thereof.

* * * * *